(12) United States Patent
Furukawa et al.

(10) Patent No.: US 11,381,889 B2
(45) Date of Patent: Jul. 5, 2022

(54) INFORMATION TRANSMISSION APPARATUS AND APPLIANCE MANAGEMENT SYSTEM FOR OPTIMIZING TRANSMISSION EFFICIENCY WITHOUT DECREASING NUMBER OF ITEMS OF TRANSMISSION DATA OR TRANSMISSION FREQUENCY

(71) Applicant: DAIKIN INDUSTRIES, LTD., Osaka (JP)

(72) Inventors: Shuuji Furukawa, Osaka (JP); Kenta Nohara, Osaka (JP); Gou Nakatsuka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/277,278

(22) PCT Filed: Sep. 24, 2019

(86) PCT No.: PCT/JP2019/037340
§ 371 (c)(1),
(2) Date: Mar. 17, 2021

(87) PCT Pub. No.: WO2020/067049
PCT Pub. Date: Apr. 2, 2020

(65) Prior Publication Data
US 2021/0314679 A1    Oct. 7, 2021

(30) Foreign Application Priority Data
Sep. 28, 2018 (JP) .............................. JP2018-184368

(51) Int. Cl.
*F24F 11/64* (2018.01)
*G07C 3/00* (2006.01)
(Continued)

(52) U.S. Cl.
CPC ............... *H04Q 9/00* (2013.01); *F24F 11/38* (2018.01); *F24F 11/64* (2018.01); *G06F 16/20* (2019.01);
(Continued)

(58) Field of Classification Search
CPC .. F24F 11/30; F24F 11/54; F24F 11/63; F24F 11/64; F24F 11/62; F24F 11/56;
(Continued)

(56) References Cited

U.S. PATENT DOCUMENTS

| 6,061,763 | A | * | 5/2000 | Rubin | ................. | G06F 12/0866 |
| | | | | | | 711/129 |
| 6,978,627 | B2 | * | 12/2005 | Masui | ...................... | F24F 11/30 |
| | | | | | | 62/127 |

(Continued)

FOREIGN PATENT DOCUMENTS

| JP | 5-64268 A | 3/1993 |
| JP | 2006-279685 A | 10/2006 |

(Continued)

OTHER PUBLICATIONS

International Search Report of corresponding PCT Application No. PCT/JP2019/037340 dated Nov. 26, 2019.

(Continued)

*Primary Examiner* — Darrin D Dunn
(74) *Attorney, Agent, or Firm* — Global IP Counselors, LLP (57) ABSTRACT

An appliance management system manages information about appliances. The system includes an information collection system and an information transmission apparatus. The information collection system includes a database storing the information about the appliances, and first and second reception processing units that write information about the appliances that has been received to the database.

(Continued)

The information transmission apparatus includes a transmission unit that transmits the information about the appliances to the first or second reception processing unit via a communication line, and a transmission information creation unit that creates transmission information as the information about the appliances. The transmission information creation unit creates as the transmission information to be sent to the first and second reception processing units, first and second transmission information from first and second type information about the appliances, respectively. The transmission unit sends the first and second transmission information to the first and second reception processing units.

18 Claims, 5 Drawing Sheets

(51) Int. Cl.
  *H04L 67/12*     (2022.01)
  *H04Q 9/00*     (2006.01)
  *F24F 11/38*     (2018.01)
  *G06F 16/20*     (2019.01)
  *H04L 67/141*    (2022.01)

(52) U.S. Cl.
  CPC .............. *G07C 3/00* (2013.01); *H04L 67/141* (2013.01); *H04L 67/12* (2013.01)

(58) Field of Classification Search
  CPC ......... F24F 11/58; F24F 11/65; G06F 3/0656; G06F 3/0679; G06F 2212/2022; G06F 2212/7203; G06F 13/1673; G06F 17/18; G06F 11/0709; G06F 11/0721; G05B 2219/2614; G05B 15/02; G05B 19/042; H04L 12/28; H04L 1/1835; H04L 1/1867; H04L 69/16; H04L 69/163; G08B 26/007; G08B 25/10; H04W 28/0278; H04Q 9/00; H04Q 2209/826; H04Q 2209/10; H04Q 2209/823
  See application file for complete search history.

(56) References Cited

U.S. PATENT DOCUMENTS

| | | | |
|---|---|---|---|
| 9,368,436 B2* | 6/2016 | Schneegans | ...... H01L 23/49586 |
| 2007/0242688 A1* | 10/2007 | McFarland | .......... H04L 12/2825 370/445 |
| 2010/0246602 A1* | 9/2010 | Barreto | ................... H04L 69/04 370/466 |
| 2011/0235542 A1* | 9/2011 | Li | ........................ H04L 41/5067 370/252 |
| 2013/0013805 A1* | 1/2013 | Sridharan | ............. H04L 69/163 709/237 |
| 2014/0028462 A1* | 1/2014 | Lawson | ................... H04Q 9/00 340/870.01 |
| 2014/0136903 A1* | 5/2014 | Hyde | .................. G11C 29/886 714/47.3 |
| 2015/0127174 A1 | 5/2015 | Quam et al. | |
| 2015/0249581 A1 | 9/2015 | Fujiyama et al. | |
| 2017/0060436 A1* | 3/2017 | Trika | ...................... G06F 3/068 |
| 2017/0060439 A1* | 3/2017 | Harasawa | ............. G06F 3/0656 |
| 2017/0090755 A1* | 3/2017 | Sun | ........................ G06F 3/0688 |
| 2017/0180277 A1 | 6/2017 | Brady et al. | |
| 2017/0187588 A1* | 6/2017 | Nolan | ................. H04L 43/0811 |
| 2018/0088863 A1* | 3/2018 | Lee | ........................ G06F 3/0659 |
| 2018/0102977 A1* | 4/2018 | Tomisho | ............... H04L 47/263 |
| 2019/0004949 A1* | 1/2019 | Kim | ...................... G06F 3/0614 |
| 2019/0049138 A1 | 2/2019 | Matsumoto et al. | |
| 2020/0133219 A1* | 4/2020 | Ishizaka | .................. F24F 11/54 |

FOREIGN PATENT DOCUMENTS

| | | |
|---|---|---|
| JP | 2009-59270 A | 3/2009 |
| JP | 2017-117445 A | 6/2017 |
| JP | 2017-156080 A | 9/2017 |

OTHER PUBLICATIONS

International Preliminary Report of corresponding PCT Application No. PCT/JP2019/037340 dated Apr. 8, 2021.
European Search Report of corresponding EP Application No. 19 86 4702.6 dated Oct. 14, 2021.

* cited by examiner

FIG. 1

| APPLIANCE | CATEGORY OF APPLIANCE INFORMATION | APPLIANCE INFORMATION | | | | |
|---|---|---|---|---|---|---|
| | | ABNORMALITY DETECTION INFORMATION | TRANSMISSION ABNORMALITY | INFORMATION PROCESSING ABNORMALITY | ⋮ | |
| AIR CONDITIONER | FIRST-TYPE APPLIANCE OPERATION INFORMATION | | | | | |
| | SECOND-TYPE APPLIANCE OPERATION INFORMATION | OPERATION/ NON-OPERATION | OPERATING MODE | SET TEMPERATURE | ⋮ | |
| VENTILATOR | FIRST-TYPE APPLIANCE OPERATION INFORMATION | | | | | |
| | SECOND-TYPE APPLIANCE OPERATION INFORMATION | ⋮ | ⋮ | | | |
| ⋮ | | | | | | |

INFORMATION TRANSMISSION APPARATUS AND APPLIANCE MANAGEMENT SYSTEM FOR OPTIMIZING TRANSMISSION EFFICIENCY WITHOUT DECREASING NUMBER OF ITEMS OF TRANSMISSION DATA OR TRANSMISSION FREQUENCY

CROSS-REFERENCE TO RELATED APPLICATIONS

This U.S. National stage application claims priority under 35 U.S.C. § 119(a) to Japanese Patent Application No. 2018-184368, filed in Japan on Sep. 28, 2018, the entire contents of which are hereby incorporated herein by reference.

BACKGROUND

Field of the Invention

The present disclosure relates to an information transmission apparatus and an appliance management system.

Background Information

Remote management systems that remotely obtain and manage information about appliances are currently available. For example, in a remote management system described in Japanese Unexamined Patent Application Publication No. 2017-156080, a remote information management apparatus collects and accumulates data and operation histories transmitted from air conditioners installed in a large number of buildings.

SUMMARY

The remote management system described in PTL 1 (Japanese Unexamined Patent Application Publication No. 2017-156080) employs a configuration that allows a change in items included in air conditioner information that is to be transmitted and a change in the transmission frequency in order to reduce wasteful use of system resources, such as a computational processing capacity and a data communication capacity.

However, it is desirable to manage appliances, such as air conditioners, more appropriately and to operate appliances more efficiently so as to further save energy, and therefore, it is not preferable to simply decrease the number of items of transmission data. Similarly, a simple decrease in the transmission frequency may make real-time appliance management difficult.

An information transmission apparatus according to a first aspect includes a transmission unit and a transmission information creation unit. The transmission unit transmits, to an information collection system remotely collecting information about appliances, information about the appliances via a communication line. The transmission information creation unit creates transmission information. The transmission information is information to be sent to the information collection system and is information about one or more of the appliances. The information collection system includes a first reception processing unit in which a buffer capable of temporarily saving information has a large capacity, and a second reception processing unit in which a buffer capable of temporarily saving information has a capacity smaller than in the first reception processing unit. The transmission information creation unit creates first transmission information from first-type information about the appliances. The first transmission information is the transmission information to be sent to the first reception processing unit. The transmission information creation unit creates second transmission information from second-type information about the appliances. The second transmission information is the transmission information to be sent to the second reception processing unit. The transmission unit sends the first transmission information to the first reception processing unit and sends the second transmission information to the second reception processing unit.

In this information transmission apparatus, considering that the information collection system, which is a destination to which information about the appliances is transmitted via the communication line, includes the first reception processing unit and the second reception processing unit, the first transmission information to be sent to the first reception processing unit is created from the first-type information about the appliances, and the second transmission information to be sent to the second reception processing unit is created from the second-type information about the appliances. That is, for the first reception processing unit and the second reception processing unit that differ in the capacity of the buffer capable of temporarily saving information, creation of transmission information from types of information about the appliances that match the characteristics of the respective buffers is enabled. Accordingly, information about the appliances can be transmitted to the information collection system from the information transmission apparatus without the need of significantly decreasing the number of items of transmission data or without the need of significantly lowering the transmission frequency.

An information transmission apparatus according to a second aspect includes a transmission unit and a transmission information creation unit. The transmission unit transmits, to an information collection system remotely collecting information about appliances, information about the appliances via a communication line. The transmission information creation unit creates transmission information. The transmission information is information to be sent to the information collection system and is information about one or more of the appliances. The information collection system includes a database that stores the information about the appliances, a first reception processing unit, and a second reception processing unit. In the first reception processing unit, a write failure rate when information about the appliances that has been received is written to the database is low. In the second reception processing unit, the write failure rate is higher than in the first reception processing unit. The transmission information creation unit creates first transmission information from first-type information about the appliances. The first transmission information is the transmission information to be sent to the first reception processing unit. The transmission information creation unit creates second transmission information from second-type information about the appliances. The second transmission information is the transmission information to be sent to the second reception processing unit. The transmission unit sends the first transmission information to the first reception processing unit and sends the second transmission information to the second reception processing unit.

In this information transmission apparatus, considering that the information collection system, which is a destination to which information about the appliances is transmitted via the communication line, includes the first reception processing unit and the second reception processing unit, the first transmission information to be sent to the first reception processing unit is created from the first-type information about the appliances, and the second transmission information to be sent to the second reception processing unit is created from the second-type information about the appliances. That is, for the first reception processing unit and the second reception processing unit that differ in the write failure rate, creation of transmission information from types of information about the appliances that match the characteristics of write failures in the respective reception processing units is enabled. Accordingly, information about the appliances can be transmitted to the information collection system from the information transmission apparatus without the need of significantly decreasing the number of items of transmission data or without the need of significantly lowering the transmission frequency.

An information transmission apparatus according to a third aspect is the information transmission apparatus according to the first or second aspect, in which the transmission unit sends the first transmission information to the first reception processing unit and sends the second transmission information to the second reception processing unit with a frequency of once every predetermined period of five minutes or less.

Here, both the first transmission information and the second transmission information are sent to the information collection system with a relatively high frequency. That is, this information transmission apparatus enables to real-time sending to some extent. To enable real-time sending at a higher level, it is preferable to perform transmission with a frequency of once every predetermined period of two minutes or less (for example, at intervals of one minute).

An information transmission apparatus according to a fourth aspect is the information transmission apparatus according to the third aspect, in which the transmission information creation unit creates third transmission information from the first-type information about the appliances and from the second-type information about the appliances. The transmission unit sends the third transmission information to the first reception processing unit at intervals often minutes or more.

Here, the third transmission information for which the communication volume tends to be larger than the communication volume for the first transmission information and that for the second transmission information is sent to the first reception processing unit of the information collection system at intervals of ten minutes or more. The first reception processing unit has a larger buffer capacity or a lower write failure rate than the second reception processing unit. Therefore, the probability of the information collection system successfully receiving and processing the third transmission information is high, and even if the second reception processing unit fails to perform a process for receiving the second transmission information, information collection can later be compensated for by the third transmission information.

An information transmission apparatus according to a fifth aspect is the information transmission apparatus according to any one of the first to fourth aspects, in which a communication volume necessary for a handshake between the transmission unit and the first reception processing unit performed after establishment of communication via the communication line is larger than a communication volume necessary for a handshake between the transmission unit and the second reception processing unit performed after establishment of communication via the communication line.

Here, for the first reception processing unit and the second reception processing unit that differ in the communication volume necessary for a handshake, creation of transmission information from types of information about the appliances that match the characteristics of the respective reception processing units is enabled.

An information transmission apparatus according to a sixth aspect is the information transmission apparatus according to any one of the first to fifth aspects, in which the appliances that are targets of information collection by the information collection system are air conditioners. The first-type information about the appliances includes at least one of information about an abnormality in the air conditioners, information about an abnormality in the transmission unit, and information about an abnormality in the transmission information creation unit. The second-type information about the appliances includes at least one of information about operation/non-operation of the air conditioners, information about an operating mode of the air conditioners, and a set temperature of the air conditioners.

An information transmission apparatus according to a seventh aspect is the information transmission apparatus according to any one of the first to sixth aspects, in which the transmission information creation unit creates the first transmission information from information about the appliances that has been changed from the information about the appliances included in the first transmission information previously sent from the transmission unit.

Here, the amount of information of the first transmission information can be reduced.

An appliance management system according to an eighth aspect is an appliance management system managing information about a plurality of appliances, including an information collection system and an information transmission apparatus. The information collection system includes a database storing the information about the appliances, a first reception processing unit, and a second reception processing unit. The first reception processing unit writes information about the appliances that has been received to the database. The first reception processing unit includes a first buffer capable of temporarily saving information. The second reception processing unit writes information about the appliances that has been received to the database. The second reception processing unit includes a second buffer capable of temporarily saving information. The first buffer has a capacity larger than a capacity of the second buffer. The information transmission apparatus includes a transmission unit and a transmission information creation unit. The transmission unit transmits the information about the appliances to the first reception processing unit or to the second reception processing unit via a communication line. The transmission information creation unit creates transmission information, which is the information about the appliances to be transmitted by the transmission unit. The transmission information creation unit creates as the transmission information to be sent to the first reception processing unit, first transmission information from first-type information about the appliances. The transmission information creation unit creates as the transmission information to be sent to the second reception processing unit, second transmission information from second-type information about the appliances. The transmission unit sends the first transmission information to the first reception processing unit and sends the second transmission information to the second reception processing unit.

In this appliance management system, considering that the information collection system includes the first reception processing unit and the second reception processing unit, the first transmission information to be sent to the first reception processing unit is created from the first-type information about the appliances, and the second transmission information to be sent to the second reception processing unit is created from the second-type information about the appliances. That is, for the first reception processing unit and the second reception processing unit that differ in the capacity of the buffer capable of temporarily saving information, creation of transmission information from types of information about the appliances that match the characteristics of the respective buffers is enabled. Accordingly, information about the appliances can be transmitted to the information collection system from the information transmission apparatus without the need of significantly decreasing the number of items of transmission data or without the need of significantly lowering the transmission frequency.

An appliance management system according to a ninth aspect is an appliance management system managing information about a plurality of appliances, including an information collection system and an information transmission apparatus. The information collection system includes a database storing the information about the appliances, a first reception processing unit, and a second reception processing unit. The first reception processing unit writes information about the appliances that has been received to the database. In the first reception processing unit, a write failure rate when the information about the appliances that has been received is written to the database is low. The second reception processing unit writes information about the appliances that has been received to the database. In the second reception processing unit, a write failure rate when the information about the appliances that has been received is written to the database is higher than the write failure rate in the first reception processing unit. The information transmission apparatus includes a transmission unit and a transmission information creation unit. The transmission unit transmits the information about the appliances to the first reception processing unit or to the second reception processing unit via a communication line. The transmission information creation unit creates transmission information, which is the information about the appliances to be transmitted by the transmission unit. The transmission information creation unit creates as the transmission information to be sent to the first reception processing unit, first transmission information from first-type information about the appliances. The transmission information creation unit creates as the transmission information to be sent to the second reception processing unit, second transmission information from second-type information about the appliances. The transmission unit sends the first transmission information to the first reception processing unit and sends the second transmission information to the second reception processing unit.

In this appliance management system, considering that the information collection system includes the first reception processing unit and the second reception processing unit, the first transmission information to be sent to the first reception processing unit is created from the first-type information about the appliances, and the second transmission information to be sent to the second reception processing unit is created from the second-type information about the appliances. That is, for the first reception processing unit and the second reception processing unit that differ in the write failure rate, creation of transmission information from types of information about the appliances that match the characteristics of write failures in the respective reception processing units is enabled. Accordingly, information about the appliances can be transmitted to the information collection system from the information transmission apparatus without the need of significantly decreasing the number of items of transmission data or without the need of significantly lowering the transmission frequency.

DETAILED DESCRIPTION OF EMBODIMENT(S)

(1) Overall Configuration

An appliance management system 90 remotely manages a large number of appliances 11, 12, . . . , such as air conditioners 11 and ventilators 12, installed in buildings 10 and in factories (not illustrated). Specifically, the appliance management system 90 uses a cloud computing service 100 to remotely collect operation data of the appliances 11, 12, . . . and remotely monitor the operating conditions of the appliances. Further, the appliance management system 90 plays a role in remotely sending an operation instruction to each appliance on the basis of a user operation or the operating conditions of the appliances 11, 12, . . . .

The appliance management system 90 mainly includes an appliance management computer 91 that is installed in a remote place away from the buildings 10 and devices of the cloud computing service 100 that are connected to the appliance management computer 91 via a public line 95, such as the Internet, or a leased line. The appliance management system 90 includes a local controller 21 and/or a communication unit 11a. The local controller 21 and/or the communication unit 11a are connected to the devices of the cloud computing service 100 via the public line 95. The local controller 21 is connected to the appliances 11, 12, . . . installed in the building 10. The communication unit 11a is a unit built in the appliances 11, 12, . . . installed in the buildings 10 (in the building 10 in the right-hand part of FIG. 1, the air conditioner 11).

The appliance management system 90 provides various services to the owners of the buildings 10 and to the users of the appliances 11, 12, . . . . For example, a demand control service, a remote troubleshooting service, a remote energy saving control service, an electric power use management service, and so on are provided. To provide these services, it is necessary to collect operation data of the appliances 11, 12, . . . , environment data of the spaces where the appliances 11, 12, . . . are installed, and so on as information about the appliances (appliance information). The appliance information is sent from the local controller 21 and the communication unit 11a to the cloud computing service 100 and is collected and accumulated.

(2) Detailed Configuration (2-1) Target Appliances of Remote Monitoring and Remote Operations by Appliance Management System Appliances that are targets of remote monitoring and remote operations by the appliance management system 90 include diverse appliances, such as the air conditioners 11, the ventilators 12, lighting fixtures, elevators, and various sensors including CO2 sensors installed in the buildings 10, various facilities in factories, and so on. Here, a description is given of an example case where the air conditioners 11 installed in the building 10 are target appliances.

The air conditioner 11 is an apparatus in which a heat-source-side unit that is installed on, for example, the rooftop of the building 10 and a large number of usage-side units that are installed in rooms of the building 10 are connected to each other via connection pipes to form a refrigeration cycle. When the air conditioners 11 are installed in the building 10, an initial setting operation is performed, and the units of each air conditioner 11 are registered to the appliance management computer 91 of the appliance management system 90. When a normal operation of the air conditioners 11 starts, various types of operation data of the air conditioners 11 are collected. In a case of the air conditioner 11 including, for example, an inverter compressor, a heat exchanger, a motor-operated valve, an electromagnetic valve, a four-way switching valve, a pressure sensor, and a temperature sensor, appliance information includes, for example, the set indoor temperature, the indoor temperature, the temperature of the discharge pipe of the compressor, the temperature of the heat exchanger, the outdoor temperature, the refrigerant pressure on the discharge side of the compressor, the refrigerant pressure on the intake side of the compressor, the conditions of the electromagnetic valve and the four-way switching valve, the inverter frequency of the compressor, the current value of the compressor, the air conditioning mode (cooling, heating, dehumidification, blowing, and so on), whether or not compressor protection control is performed, the presence or absence of a transmission abnormality, a trouble code, and other information.

(2-2) Local Controller/Communication Unit Built in Appliances

As described above, the local controller 21 connected to the appliances 11, 12, . . . and the communication unit 11a built in the appliances 11, 12, . . . play a role of an information transmission apparatus that transmits information about the appliances 11, 12, . . . to the devices of the cloud computing service 100.

The local controller 21 is implemented as a computer. The local controller 21 includes a control arithmetic unit and a storage unit. As the control arithmetic unit, a processor, such as a CPU or a GPU, can be used. The control arithmetic unit reads a program stored in the storage unit and performs predetermined arithmetic processing in accordance with the program. Further, the control arithmetic unit can write an arithmetic result to the storage unit and read information stored in the storage unit in accordance with the program.

The local controller 21 includes an interface connected to the public line 95, and the interface functions as a transmission unit 70 and a reception unit 80. The processor of the local controller 21 functions as a transmission information creation unit 60 that creates transmission information to be transmitted to the devices of the cloud computing service 100.

Similarly to the local controller 21 described above, the communication unit 11a also plays a role in transmitting appliance information about the air conditioner 11 to the devices of the cloud computing service 100. Although the local controller 21 is provided separately from the air conditioner 11 and is connected to the air conditioner 11 via a communication line, the communication unit 11a is built in the air conditioner 11. The roles and configurations of the transmission information creation unit 60, the transmission unit 70, and the reception unit 80 of the communication unit 11a are the same as those of the local controller 21.

(2-2-1) Transmission Information Creation Unit

Figure 2:
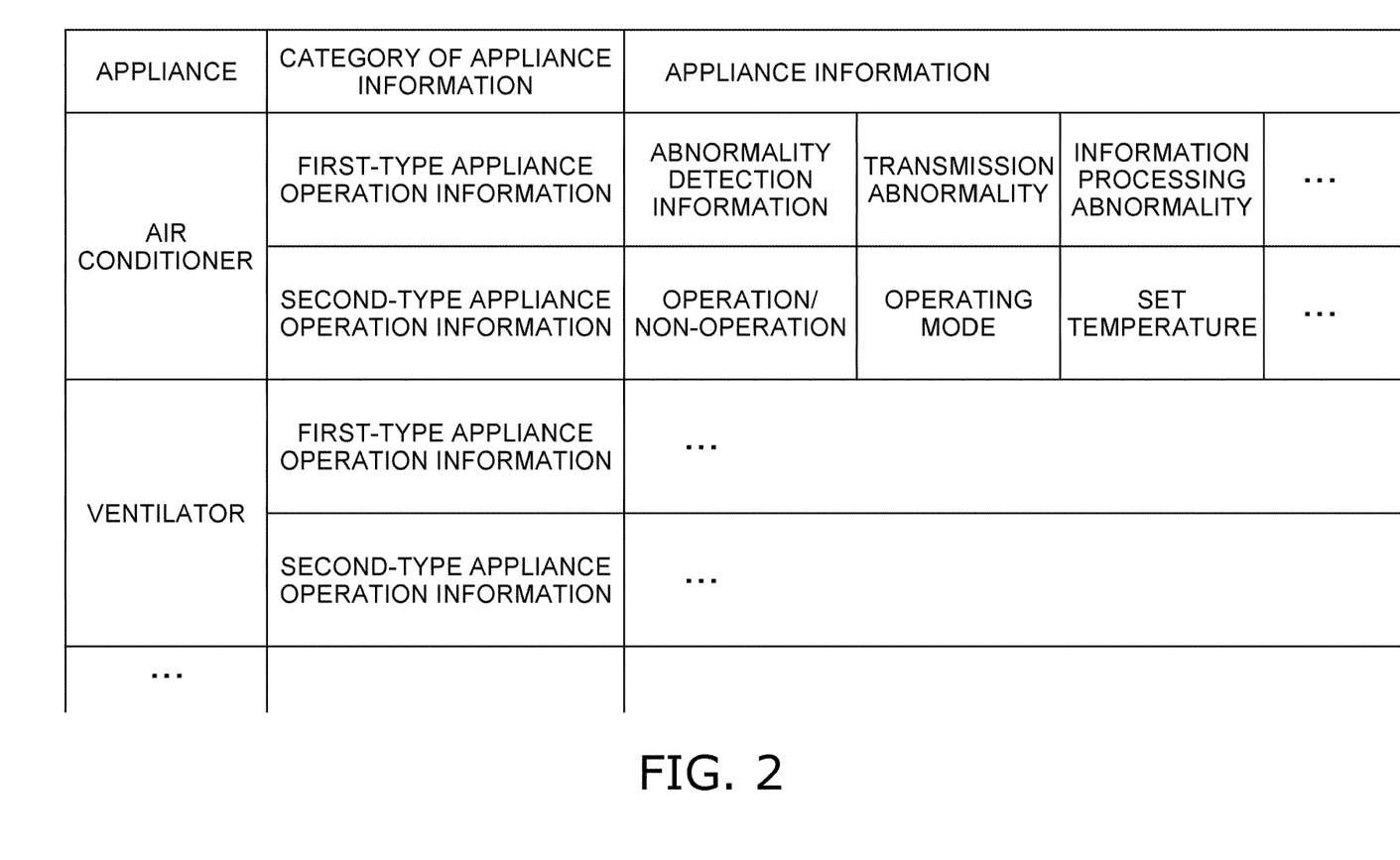
FIG. 2 is a diagram illustrating categories of appliance information.

The transmission information creation unit 60 creates transmission information, which is information to be transmitted to the devices of the cloud computing service 100. The transmission information is an aggregate of information about each appliance. In a case where the appliance is the air conditioner 11, information about the appliance includes, for example, the set indoor temperature, the indoor temperature, the temperature of the discharge pipe of the compressor, the temperature of the heat exchanger, and the outdoor temperature described above. Among these pieces of information, for example, abnormality detection information about the air conditioner 11, such as a discharge temperature abnormality, transmission abnormality information indicating an abnormality in the transmission unit 70 of the communication unit 11a, information processing abnormality information indicating an abnormality in information processing by, for example, the transmission information creation unit 60 of the communication unit 11a, and the electric power usage are categorized as first-type appliance operation information (see FIG. 2). For example, operation/non-operation of the air conditioner 11, the operating mode of the air conditioner 11, the set temperature, the outdoor temperature, the pressure of the discharge refrigerant of the compressor, and the accumulated operating time of the air conditioner 11 since previous turning on of the power (operating time) are categorized as second-type appliance operation information. Appliance information for which real-time information collection is essential for, for example, a demand control service described below and for which data loss in the cloud computing service 100 is not allowed is categorized as the first-type appliance operation information. Appliance information for which real-time information collection is preferable and for which data loss is allowed to some extent is categorized as the second-type appliance operation information.

The transmission information creation unit 60 creates first transmission information from appliance information that is categorized as the first-type appliance operation information. The transmission information creation unit 60 creates second transmission information from appliance information that is categorized as the second-type appliance operation information.

Further, the transmission information creation unit 60 accumulates appliance information categorized as the first-type appliance operation information and appliance information categorized as the second-type appliance operation information for a predetermined period (for example, one hour) to create third transmission information. The amount of information of the third transmission information is larger than the amount of information of the first transmission information and that of the second transmission information.

(2-2-2) Transmission Unit

The transmission unit 70 sends the first transmission information, the second transmission information, and the third transmission information to the devices of the cloud computing service 100 via the public line 95. Specifically, the transmission unit 70 sends the first transmission information to a first reception processing unit 110 of the cloud computing service 100 described below in real time. Here, sending of information with a frequency higher than a frequency of once every five minutes is defined as real-time sending of information. In the present embodiment, the first transmission information is sent from the transmission unit 70 to the first reception processing unit 110 with a frequency of about once every minute. Further, the transmission unit 70 similarly sends the second transmission information to a second reception processing unit 120 of the cloud computing service 100 described below in real time.

The transmission unit 70 sends the third transmission information to the first reception processing unit 110 at intervals of ten minutes or more. Specifically, the third transmission information is regularly sent from the transmission unit 70 to the first reception processing unit 110 at intervals of one hour.

(2-2-3) Reception Unit

The reception unit 80 receives information about an appliance operation sent from the appliance management computer 91 that is remotely located in a case where a demand control service or a remote energy saving control service described below is selected. The information is transmitted from an operation transmission unit 140 of the cloud computing service 100 described below in real time, specifically, at intervals of about one minute, and the reception unit 80 receives the information in real time.

(2-3) Appliance Management Computer

The appliance management computer 91 performs various processes, such as monitoring of the operating conditions of the appliances, troubleshooting of the appliances, remote energy saving control of the appliances, and demand control, on the basis of information about the appliances 11, 12, . . . in the buildings 10 collected and accumulated in an appliance information database 130 of the cloud computing service 100 described below. The appliance management computer 91 includes a processor, such as a CPU or a GPU, and a storage unit, and the processor reads a program stored in the storage unit and performs predetermined arithmetic processing in accordance with the program. Further, the processor writes an arithmetic result to the storage unit and reads information stored in the storage unit in accordance with the program.

When performing remote energy saving control or demand control for the appliances 11, 12, . . . , the appliance management computer 91 sends in real time, information about an operation instruction for the appliances 11, 12, . . . to the reception unit 80 of the local controller 21 or that of the communication unit 11a in the buildings 10 via the operation transmission unit 140 of the cloud computing service 100 described below. The operation transmission unit 140 is part of a second cloud service S2 described below and includes a buffer memory 141. Even if a transmission process fails, the operation transmission unit 140 can call again, for example, an operation command in the appliance management computer 91 to retry the transmission process, and therefore, the probability of the operation transmission unit 140 not successfully completing operation transmission is very low.

(2-4) Cloud Computing Service

The cloud computing service 100 is a service that is provided by a cloud provider, which is a predetermined service provider, and implemented by a group of computers installed within a data center. An appliance management service provider that provides an appliance management service to the owners of the buildings 10 and the users of the appliances 11, 12, . . . described above by using the appliance management computer 91 uses the service provided by the cloud provider and pays a predetermined pay-per-use charge to the cloud provider.

Figure 1:
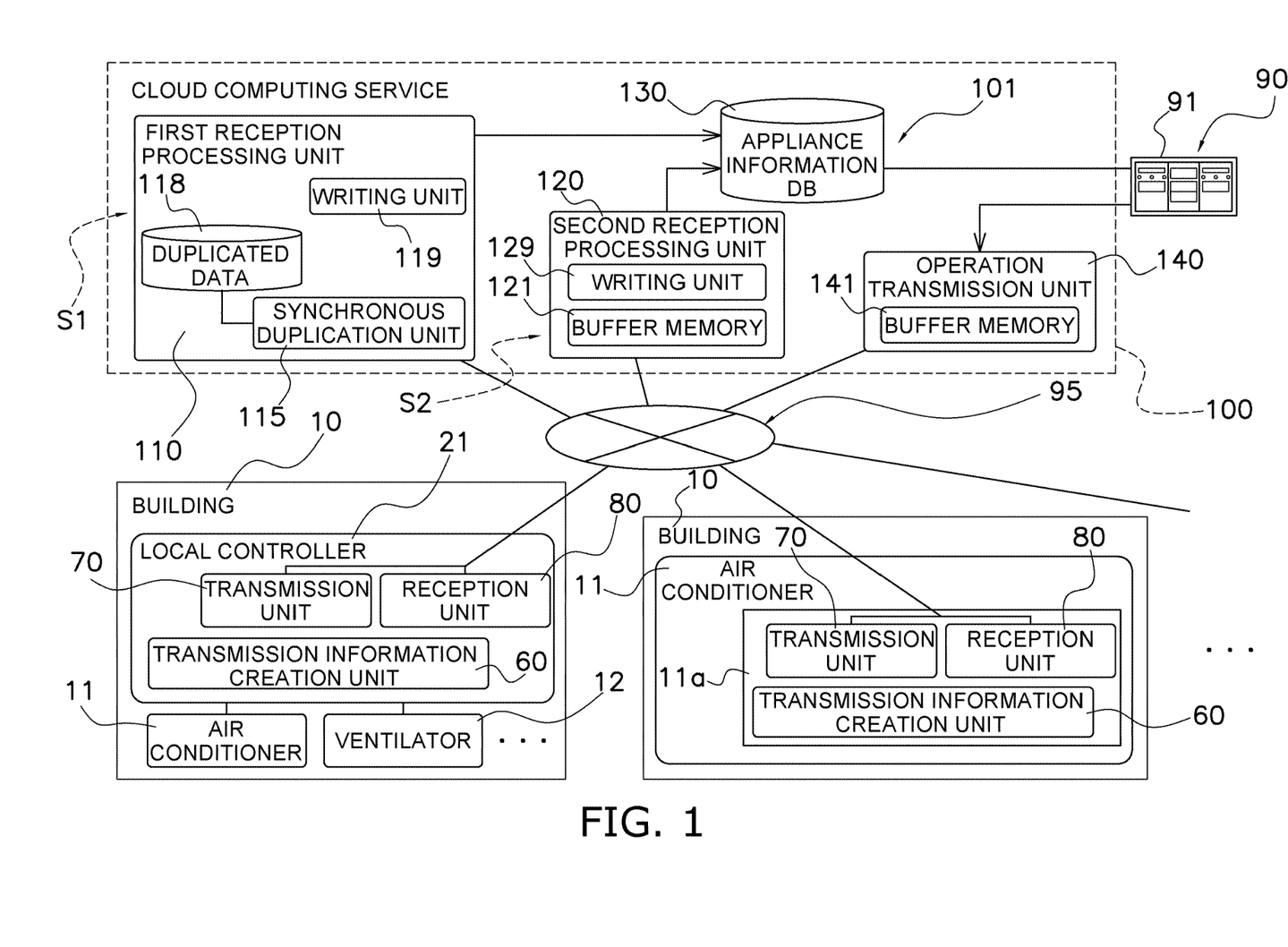
FIG. 1 is a functional block diagram of an appliance management system.

The cloud computing service 100 in the present embodiment functions as an information collection system 101 that receives a large number of pieces of appliance information and collects the pieces of appliance information in the appliance information database 130, and includes a first cloud service S1 and the second cloud service S2 as illustrated in FIG. 1.

In the first cloud service S1 in which the first reception processing unit 110 receives and processes appliance information, data capture and loading are performed substantially in real time. When new data is transmitted to the first reception processing unit 110, a synchronous duplication unit 115 writes duplicated data to a buffer storage 118 within 60 seconds, and a writing unit 119 writes appliance information to the appliance information database 130. In the synchronous duplication unit 115, the duplicated data for ten hours or more is temporarily saved. Therefore, even in a case where the number of retries to write appliance information to the appliance information database 130 becomes large, it is less likely that data loss of appliance information occurs. The first reception processing unit 110 uses HTTP/HTTPS as its communication protocol.

The second cloud service S2 in which the second reception processing unit 120 receives and processes appliance information mainly uses MQTT (Message Queuing Telemetry Transport) as its communication protocol. MQTT is a lightweight protocol and is lighter and more power saving than HTTP. However, the message delivery guarantee level (Quality of Service) is low and data loss can occur. In HTTP, the size of the header, etc. is large and a communication volume necessary for a handshake is large; however, in MQTT, a communication volume necessary for a handshake is smaller than in HTTP.

When the process for receiving and writing to the appliance information database 130 appliance information by the first reception processing unit 110 is compared with the process for receiving and writing to the appliance information database 130 appliance information by the second reception processing unit 120, there are differences (A) and (B) below.

(A)

The writing process by the writing unit 119 of the first reception processing unit 110 and the writing process by a writing unit 129 of the second reception processing unit 120 are not superior or inferior to each other in terms of the probability of write failure. However, in a case of the first reception processing unit 110, duplicated data is stored in the buffer storage 118 having a large buffer capacity, and therefore, the first reception processing unit 110 can successfully complete the process for writing appliance information to the appliance information database 130 with certainty through a writing retry process. On the other hand, in a case of the second reception processing unit 120, only a buffer memory 121 having a small buffer capacity is present, and therefore, in a case where the writing process by the writing unit 129 fails, a retry is not possible and appliance information is lost.

(B)

Figure 4A:
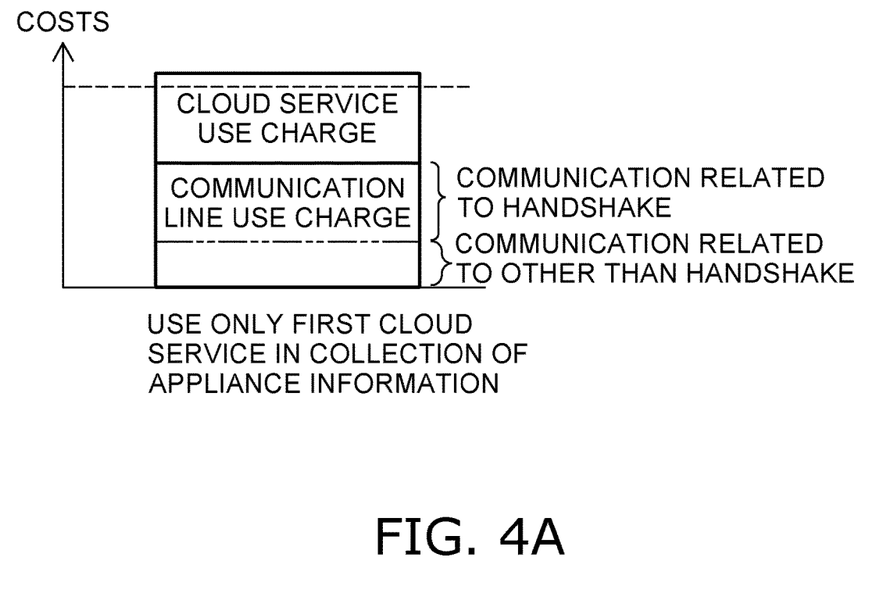
FIG. 4A is a diagram illustrating costs incurred in a case of using only a first cloud service.

A relatively large communication volume is necessary for a handshake between the first reception processing unit 110 and the transmission unit 70 of the local controller 21 or that of the communication unit 11a in the building 10 performed after establishment of communication via the public line 95. The communication volume necessary for a handshake between the first reception processing unit 110 and the transmission unit 70 is larger than the communication volume necessary for a handshake between the second reception processing unit 120 and the transmission unit 70 performed after establishment of communication via the public line 95. Therefore, if a configuration in which all pieces of appliance information are sent to the appliance information database 130 via the first reception processing unit 110 is employed, a communication line use charge for communication related to the handshake increases as illustrated in FIG. 4A.

Note that the handshake means to establish a connection after establishment of communication between two points via the public line 95 and before transfer of appliance information.

(3) Transmission of Appliance Information

Now, a procedure in which appliance information about the appliances 11, 12, . . . in the buildings 10 is sent to the devices (the first reception processing unit 110 and the second reception processing unit 120) of the cloud computing service 100 is described in detail with reference to FIG. 3.

Figure 3:
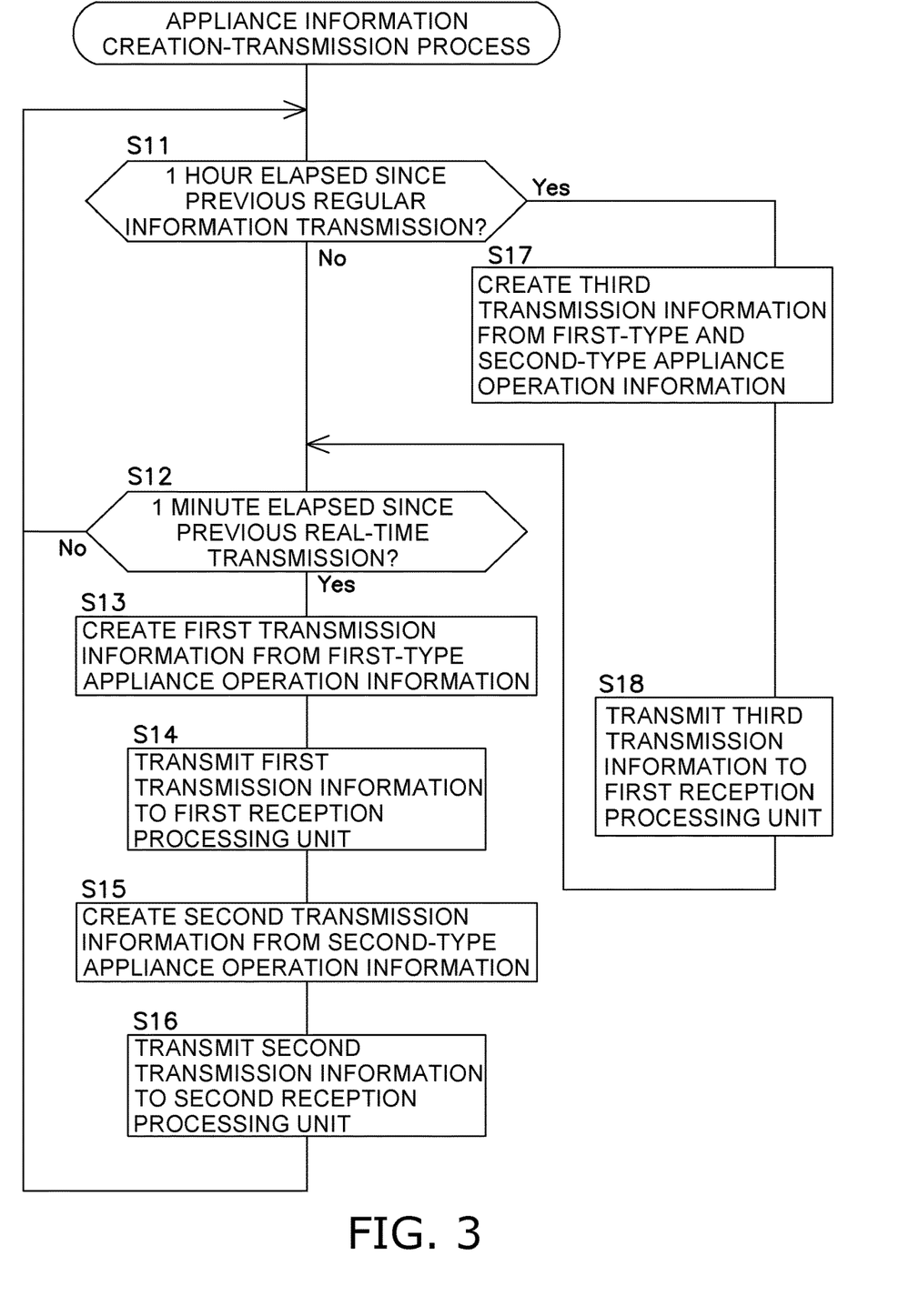
FIG. 3 is a control flowchart illustrating a process for creating and transmitting appliance information.

In step S11 in FIG. 3, the local controller 21 and the communication unit 11a determine whether one hour has elapsed since previous transmission of third transmission information (regular information transmission). In a case where one hour has not yet elapsed, the flow proceeds to step S12.

In step S12, it is determined whether one minute has elapsed since previous transmission of first transmission information and second transmission information (real-time transmission). In a case where one minute has not yet elapsed since the previous transmission, the flow returns to step S11. In a case where one minute has elapsed since the previous transmission, the flow proceeds to step S13.

In step S13, the transmission information creation unit 60 creates first transmission information from appliance information that is categorized as the first-type appliance operation information. In step S14, the transmission unit 70 transmits the first transmission information to the first reception processing unit 110. Subsequently, in step S15, the transmission information creation unit 60 creates second transmission information from appliance information categorized as the second-type appliance operation information. In step S16, the transmission unit 70 transmits the second transmission information to the second reception processing unit 120.

In a case where it is determined in step S11 that one hour has elapsed since the previous regular information transmission, the flow proceeds to step S17, and the transmission information creation unit 60 creates third transmission information on the basis of appliance information that is accumulated for one hour and categorized as the first-type appliance operation information and appliance information that is accumulated for one hour and categorized as the second-type appliance operation information. In step S18, the transmission unit 70 transmits the third transmission information to the first reception processing unit 110.

(4) Remote Operations of Appliances

As described above, the appliance management service provider that provides services related to remote monitoring and remote operations of the appliances 11, 12, . . . provides an appliance management service to the owners of the buildings 10 and the users of the appliances 11, 12, . . . while paying, for example, a cloud service use charge (see FIG. 4A and FIG. 4B) to the cloud provider. Among services implemented by the appliance management computer 91 on the basis of appliance information collected and accumulated in the appliance information database 130, three services are described in detail below.

(4-1) Remote Operations of Appliances in Demand Control Service

The owner of the building 10 in which the local controller 21 is installed can use a demand control service, which is one function of the appliance management system 90, for a charge. In the demand control service, the electric power demand of the entire building 10 is predicted for each predetermined time period (here, repeated time periods in units of 30 minutes) and in a case where the predicted demand is likely to exceed a contract demand (or a management target demand) agreed upon between the owner of the building 10 and the electric power supplier (not illustrated), the operations of appliances using electric power are remotely limited in accordance with a control method set in advance. With the demand control, the electric power demand for each predetermined time period can be reduced so as to be smaller than the contract demand or the management target demand.

In the building 10 whose owner uses the demand control service, the local controller 21 transmits data of the electric power usage necessary for demand control to the first reception processing unit 110 of the cloud computing service 100 in real time. This is because the electric power demand (power consumption) is to be limited to a threshold or below in the repeated time periods in units of 30 minutes, and unless appliance information is transmitted in real time with a frequency of about once every minute, appliance information necessary for the demand control service is not accumulated in the appliance information database 130 of the cloud computing service 100.

(4-2) Remote Operations of Appliances in Remote Energy Saving Control Service

In the remote energy saving control service, the appliance management computer 91, which is installed away from the building 10, performs energy saving control so as to reduce the amount of ventilation by the ventilator 12 in a space where the CO2 concentration is low and to reduce output of the air conditioner 11 in a space where no one is determined to be present on the basis of information from a human presence sensor, while keeping the temperature within the building 10 comfortable to the extent possible. When the outdoor temperature is low, an outside air intake function of the air conditioner 11 can be activated to reduce the power consumption of the air conditioner 11.

(4-3) Remote Troubleshooting Service

In the remote troubleshooting service, for example, on the basis of a change in the current value or in the pressure of the discharge refrigerant of the compressor of the air conditioner 11 over a long time span, the accumulated operating time of the compressor, and so on, the life or the possibility of trouble of the compressor is determined. At the time when the compressor is to be replaced, a notification is sent to the user of the air conditioner 11.

(5) Features of Appliance Management System (5-1)

Considering that the cloud computing service 100, which is a destination to which appliance information is transmitted via the public line 95, includes the first reception processing unit 110 and the second reception processing unit 120, the local controller 21 and the communication unit 11*a* built in the appliances 11, 12, . . . of the appliance management system 90 according to the present embodiment create first transmission information to be sent to the first reception processing unit 110 from appliance information categorized as the first-type appliance operation information and create second transmission information to be sent to the second reception processing unit 120 from appliance information categorized as the second-type appliance operation information. More specifically, for the first reception processing unit 110 and the second reception processing unit 120 that differ in the capacity of the buffer capable of temporarily saving appliance information, the transmission information creation unit 60 creates first transmission information and second transmission information from appliance information of types that match the characteristics of the respective buffers.

For example, data of the electric power usage of the appliances 11, 12, . . . , which is appliance information for which real-time and reliable information collection is required in the demand control service, is sent to the first reception processing unit 110 as first transmission information. In the case of the first reception processing unit 110, duplicated data is stored in the buffer storage 118 having a large buffer capacity, and therefore, the first reception processing unit 110 can complete the process for writing appliance information to the appliance information database 130 with certainty through a writing retry process. Abnormality detection information that needs to be communicated to the owner or user of the air conditioner 11 in real time and a transmission abnormality and an information processing abnormality related to information transmission are also sent to the first reception processing unit 110 that attains real-time and reliable information collection, as first transmission information.

Meanwhile, data of the operating mode, the operating time, and so on, which is appliance information necessary for the remote troubleshooting service but has almost no effect on the quality of the service even if the process for writing to the appliance information database 130 is not completed in real time with certainty, is sent to the second reception processing unit 120 as second transmission information. In the case of the second reception processing unit 120, only the buffer memory 121 having a small buffer capacity is present, and therefore, in a case where the writing process by the writing unit 129 fails, a retry is not possible and appliance information is lost. However, even if data is lost, appliance information, such as the operating time, categorized as the second-type appliance operation information is sent to the first reception processing unit 110 as third transmission information every hour and written to the appliance information database 130 at that time with certainty. Therefore, the inconvenience of insufficiency of appliance information necessary for the remote troubleshooting service is avoided.

As described above, the transmission information creation unit 60 of the appliance management system 90 uses the second reception processing unit 120 having a small buffer capacity or the first reception processing unit 110 having a buffer capacity larger than in the second reception processing unit 120 as a transmission destination depending on the situation and creates transmission information (first to third transmission information) appropriate to the first reception processing unit 110 and to the second reception processing unit 120 that differ in the write failure rate in writing appliance information to the appliance information database 130, due to the possibility of a retry. Accordingly, a large number of pieces of appliance information can be transmitted to the cloud computing service 100 from the local controller 21 and from the communication unit 11*a* without the need of significantly decreasing the number of items of appliance information that is to be transmitted or without the need of significantly lowering the transmission frequency.

The first cloud service S1 in which the first reception processing unit 110 of the cloud computing service 100 receives and processes appliance information and the second cloud service S2 in which the second reception processing unit 120 receives and processes appliance information differ in the certainty of data collection as described above and also differ in cloud service use charge. The use charge for the first cloud service S1 is higher than the use charge for the second cloud service S2. Therefore, if all of the first transmission information, second transmission information, and third transmission information are sent to the first reception processing unit 110 and only the first cloud service S1 is used in collection of appliance information, the costs exceed the allowable cost represented by a dashed line as illustrated in FIG. 4A. In this case, the service provision price of the appliance management service provider increases, which may hinder widespread use of the remote energy saving control service and so on.

Figure 4B:
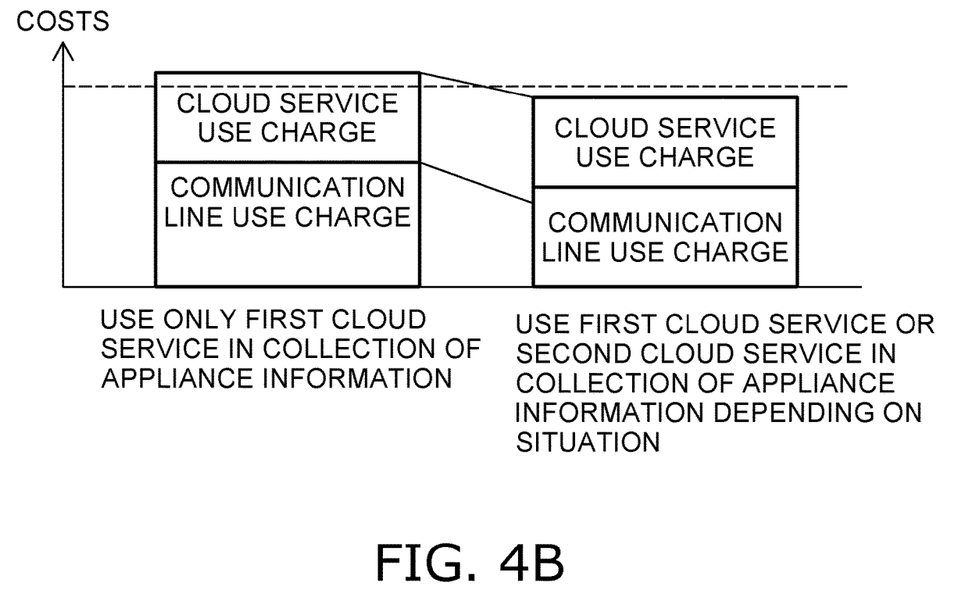
FIG. 4B is a diagram for comparing costs incurred in the case of using only the first cloud service with costs incurred in a case of using the first cloud service or a second cloud service depending on the situation.

On the other hand, in the appliance management system 90 according to the present embodiment, the first cloud service S1 or the second cloud service S2 is used in collection of appliance information depending on the situation. That is, first transmission information and third transmission information are sent to the first reception processing unit 110, and second transmission information is sent to the second reception processing unit 120 of the second cloud service S2. Accordingly, as illustrated in FIG. 4B, the communication volume related to transmission of second transmission information is reduced by the communication volume necessary for the handshake, and the communication line use charge is reduced accordingly. The two cloud services S1 and S2 are used, and therefore, the cloud service use charge increases by a small amount but the communication volume decreases and the communication line use charge is reduced, and therefore, as illustrated in FIG. 4B, the total price to be paid by the appliance management service provider becomes lower in a case where the first cloud service S1 or the second cloud service S2 is used depending on the situation than in a case where only the first cloud service S1 is used. As a consequence, the use charge for the remote energy saving control service, etc. that is provided by the appliance management service provider is reduced.

(5-2)

In the appliance management system 90 according to the present embodiment, both first transmission information and second transmission information are sent to the cloud computing service 100 from the local controller 21 and from the communication unit 11*a* with a high frequency so as to ensure real-time sending. The first transmission information and the second transmission information are collected in the appliance information database 130 at intervals of about one minute, which allows, for example, demand control that requires real-time appliance information to be performed without delay.

(5-3)

In the appliance management system 90 according to the present embodiment, third transmission information for which the communication volume is larger than that for first transmission information and for second transmission information is sent to the first reception processing unit 110 of the cloud computing service 100 at intervals of ten minutes or more. As described above, the first reception processing unit 110 has a larger buffer capacity than the second reception processing unit 120 and allows a retry, and therefore, the write failure rate is very low. Accordingly, the probability of the first reception processing unit 110 receiving the third transmission information and successfully performing a writing process is very high, and even if the second reception processing unit 120 fails to perform a process for the second transmission information (a process for writing to the appliance information database 130 after reception), information collection in the appliance information database 130 can be compensated for by the third transmission information sent later.

(6) Modifications (6-1)

To further reduce the communication volume, the transmission information creation unit 60 may create first transmission information by extracting only appliance information in which content is changed from that of the appliance information included in first transmission information previously sent from the transmission unit 70. In this case, appliance information that is included in the previous first transmission information and in which content is not changed can be excluded from the next first transmission information. Accordingly, the amount of information of the first transmission information can be reduced. In communication to the first reception processing unit 110, a communication volume necessary for a handshake is large, and a reduction in the amount of information of the first transmission information is specifically effective in cost reduction.

The transmission information creation unit 60 may create second transmission information and third transmission information by extracting only appliance information in which content is changed from that of the appliance information included in second transmission information/third transmission information previously sent from the transmission unit 70.

(6-2)

Figure 5:
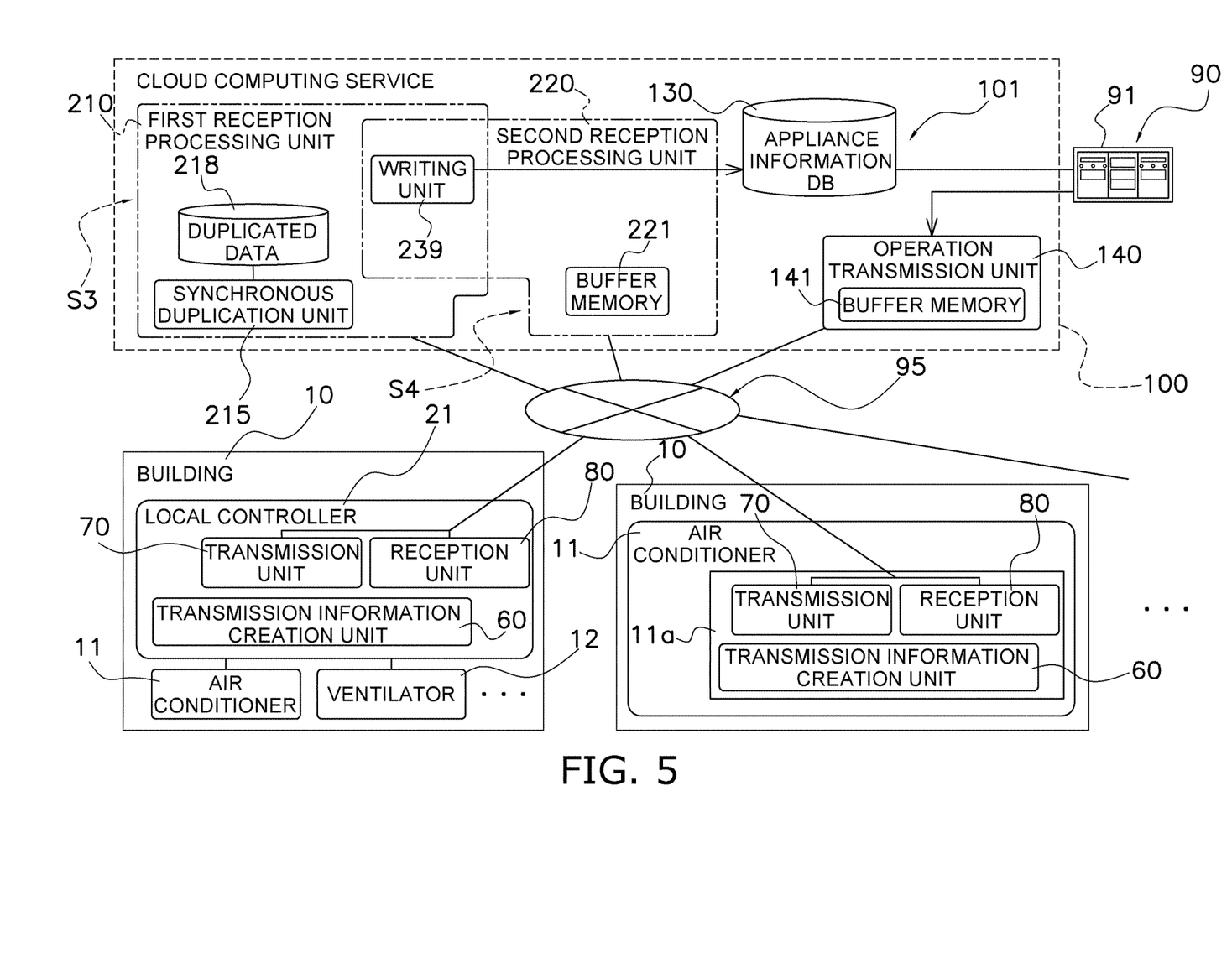
FIG. 5 is a functional block diagram of the appliance management system according to a modification.

FIG. 1, which is referenced to describe the embodiment above, illustrates a form in which the first reception processing unit 110 and the second reception processing unit 120 of the cloud computing service 100 respectively include the writing unit 119 and the writing unit 129; however, various forms including a form as illustrated in FIG. 5 in which reception processing units of two cloud services share one writing unit can be assumed as a configuration of the devices (group of computers) of the cloud computing service.

For example, in the cloud computing service illustrated in FIG. 5, when new data (appliance information) is transmitted to a first reception processing unit 210 of a third cloud service S3, a synchronous duplication unit 215 writes duplicated data to a buffer storage 218, and a writing unit 239 writes the appliance information to the appliance information database 130. Meanwhile, when new data (appliance information) is transmitted, a second reception processing unit 220 of a fourth cloud service S4 uses a buffer memory 221 having a small capacity to perform a process for receiving and writing the appliance information to the appliance information database 130 by the writing unit 239. Accordingly, the cloud computing service illustrated in FIG. 5 employs a form in which the first reception processing unit 210 of the third cloud service S3 and the second reception processing unit 220 of the fourth cloud service S4 share one writing unit 239. Also in this case, the first reception processing unit 210 and the second reception processing unit 220 differ in buffer capacity, and therefore, differ in the write failure rate in writing appliance information to the appliance information database 130. That is, in a case of the first reception processing unit 210, duplicated data is stored in the buffer storage 218 having a large buffer capacity, and therefore, a process for writing appliance information to the appliance information database 130 can be successfully completed with certainty through a writing retry process. On the other hand, in a case of the second reception processing unit 220, only the buffer memory 221 having a small buffer capacity is present, and therefore, in a case where a writing process by the writing unit 239 fails, a retry is not possible and appliance information is lost.

Also in a case where the first reception processing unit 210 and the second reception processing unit 220 are used to collect appliance information in the appliance information database 130, the functions of the transmission information creation unit 60 of the above-described embodiment is effective as in the case of using the first reception processing unit 110 and the second reception processing unit 120 of the above-described embodiment.

(6-3)

Although the embodiment of the present disclosure has been described above, it should be understood that various modifications can be made to the forms and specifics without departing from the spirit and scope of the present disclosure described in the claims.

What is claimed is:

1. An appliance management system managing information about a plurality of appliances, the appliance management system comprising:
   a cloud computing service made up of a group of computers, each of the computers including a processor, the cloud computing service being programmed to include
      a database storing the information about the appliances,
      a first reception processing unit configured to write information about the appliances that has been received to the database, and
      a second reception processing unit configured to write information about the appliances that has been received to the database; and
   a local controller including a processor, the local controller being programmed to include
      a transmission unit configured to transmit the information about the appliances to the first reception processing unit or to the second reception processing unit via a communication line, and
      a transmission information creation unit configured to create transmission information, the transmission information being the information about the appliances to be transmitted by the transmission unit,
   the first reception processing unit including a first buffer configured to temporarily save information,
   the second reception processing unit including a second buffer configured to temporarily save information,
   the first buffer having a capacity larger than a capacity of the second buffer,
   the transmission information creation unit being further configured to
      create as the transmission information to be sent to the first reception processing unit, first transmission information from first-type information about the appliances, the first-type information being information for which data loss is not allowed, create as the transmission information to be sent to the second reception processing; unit, second transmission information from second-type information about the appliances, the second-type information being information for which data loss is allowed, and create third transmission information from the first-type information about the, appliance and from the second-type information about the appliance, and the transmission unit being further configured to send the first transmission information to the first reception processing unit at intervals of once every first predetermined period, send the second transmission information to the second reception processing unit at intervals of once every second predetermined period, the second predetermined period being equal to the first predetermined period, and send the third transmission information to the first reception processing unit at intervals of once every third predetermined period, the third predetermined period being longer than each of the first predetermined period and the second predetermined period.

2. An appliance management system managing information about a plurality of appliances, the appliance management system comprising:

a cloud computing service made up of a group of computers each of the computers including a processor. the cloud computing service being programmed to include a database storing the information about the appliances, a first reception processing unit configured to write information about the appliances that has been received to the database, and a second reception processing unit configured to write information about the appliances that has been received to the database, and a local controller including a processor, the local controller being programmed to include a transmission unit configured to transmit the information about the appliances to the first reception processing unit or to the second reception processing unit via a communication line, and a transmission information creation unit configured to create transmission information, the transmission information being the information about the appliances to be transmitted by the transmission unit, the first reception processing unit being configured to write the information about the appliances to the database with a first write failure rate, the second reception processing unit being configured to write the information about the appliances to the database with a second write failure rate, the second write failure rate being higher than the first write failure rate, the transmission information creation unit being further configured to create first transmission information as the transmission information to be sent to the first reception processing unit, the first transmission information being created from first-type information about the appliances, the first-type information being information for which data loss is not allowed, create second transmission information as the transmission information to be sent to the second reception processing unit, the second transmission information being created from second-type information about the appliances, the second-type information being information for which data loss is allowed, and create third transmission information from the first-type information about the appliance and from the second-type information about the appliance, and the transmission unit being further configured to send the first transmission information to the first reception processing unit at intervals of once every first predetermined period, the second transmission information to the second reception processing unit at intervals of once every second predetermined period, the second predetermined period being equal to the first predetermined period, and send the third transmission information to the first reception processing unit at intervals of once every third predetermined period, the third predetermined period being longer than each of the first predetermined period and the second predetermined period.

3. The appliance management system according to claim 1, wherein each of the first predetermined period and the second predetermined period is five minutes or less.

4. The appliance management system according to claim 3, wherein the third predetermined period is ten minutes or more.

5. The appliance management system according to claim 1, wherein a communication volume necessary for a handshake between the transmission unit and the first reception processing unit performed after establishment of communication via the communication line is larger than a communication volume necessary for a handshake between the transmission unit and the second reception processing unit performed after establishment of communication via the communication line.

6. The appliance management system according to claim 1, wherein the appliance is air conditioner, the first-type information about the appliance includes at least one of information about an abnormality in the air conditioners, information about an abnormality in the transmission unit, and information about an abnormality in the transmission information creation unit, and the second-type information about the appliance includes at least one of information about at least One of operation and non-operation of the air conditioners, information about an operating mode of the air conditioners, and a set temperature of the air conditioners.

7. The appliance management system according to claim 1, wherein the transmission information creation unit is further configured to create the first transmission information from information about the appliance that has been changed from the information about the appliance included in the first transmission information previously sent from the transmission unit.

8. The appliance management system according to claim 5, wherein the appliance is air conditioner, the first-type information about the appliance includes at least one of information about an abnormality in the air conditioners,
information about an abnormality in the transmission unit, and
information about an abnormally in the transmission information creation unit, and the second-type information about the appliance includes at least one of
information about at least one of operation and non-operation of the air conditioners,
information about an operating mode of the air conditioners, and
a set temperature of the air conditioners.

9. The appliance management system according to claim 5, wherein
the transmission information creation unit is further configured to create the first transmission information from information about the appliance that has been changed from the information about the appliance included in die first transmission information previously sent from the transmission unit.

10. The appliance management system according to claim 6, wherein
the transmission information creation unit is further configured to create the first transmission information from information about the appliance that has been changed from the information about the appliance included in the first transmission information previously sent from the transmission unit.

11. The appliance management system according to claim 2, wherein
each of the first predetermined period and the second predetermined period is five minutes or less.

12. The appliance management system according to claim 11, wherein
the third predetermined period is ten minutes or more.

13. The appliance management system according to claim 2, wherein
a communication volume necessary for a handshake between the transmission unit and the first reception processing unit performed after establishment of communication via the communication line
is larger than
a communication volume necessary for a handshake between the transmission unit and the second reception processing unit performed after establishment of communication via the communication line.

14. The appliance management system according to claim 13, wherein
the appliance is air conditioner,
the first-type information about the appliance includes at least one of
information about an abnormality in the air conditioners,
information about an abnormality in the transmission unit, and
information about an abnormality in the transmission information creation unit, and the second-type information about the appliance includes at least one of
information about at least one of operation and non-operation of the air conditioners,
information about an operating mode of the air conditioners, and
a set temperature of the air conditioners.

15. The appliance management system according to claim 13, wherein
the transmission information creation unit is further configured to create the first transmission information from information about the appliance that has been changed from the information about the appliance included in the first transmission information previously sent from the transmission unit.

16. The appliance management system according to claim 2, wherein
the appliance is air conditioner,
the first-type information about the appliance includes at least one of
information about an abnormality in the air conditioners,
information about an abnormality in the transmission unit, and
information about an abnormality in the transmission information creation unit, and the second-type information about the appliance includes at least one of
information about at least one of operation and non-operation of the air conditioners,
information about an operating mode of the air conditioners, and
a set temperature of the air conditioners.

17. The appliance management system according to claim 16, wherein
the transmission information creation unit is further configured to create the first transmission information from information about the appliance that has been changed from the information about the appliance included in the, first transmission information previously sent from the transmission unit.

18. The appliance management system according to claim 2, wherein
the transmission information creation unit is further configured to create the first transmission information from information about the appliance that has been changed from the information about the appliance included in the first transmission information previously sent from the transmission unit.

* * * * *